May 30, 1967   P. A. BEZZERIDES ET AL   3,322,204
PLANT THINNER
Filed Nov. 9, 1964   2 Sheets-Sheet 1
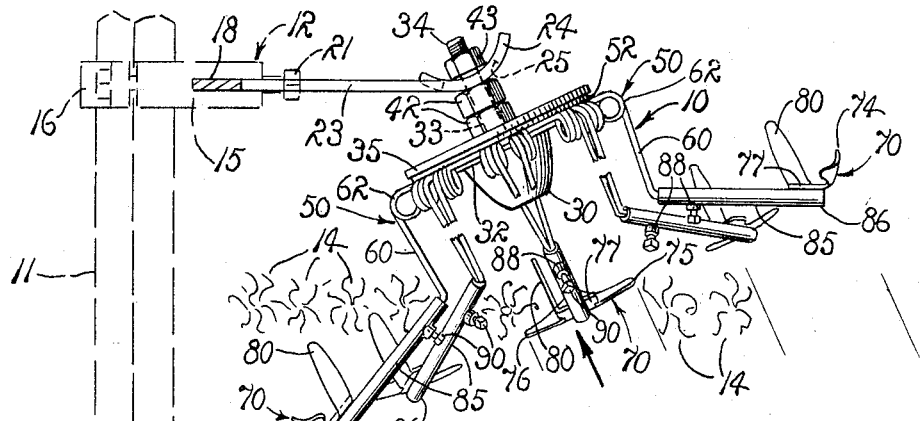
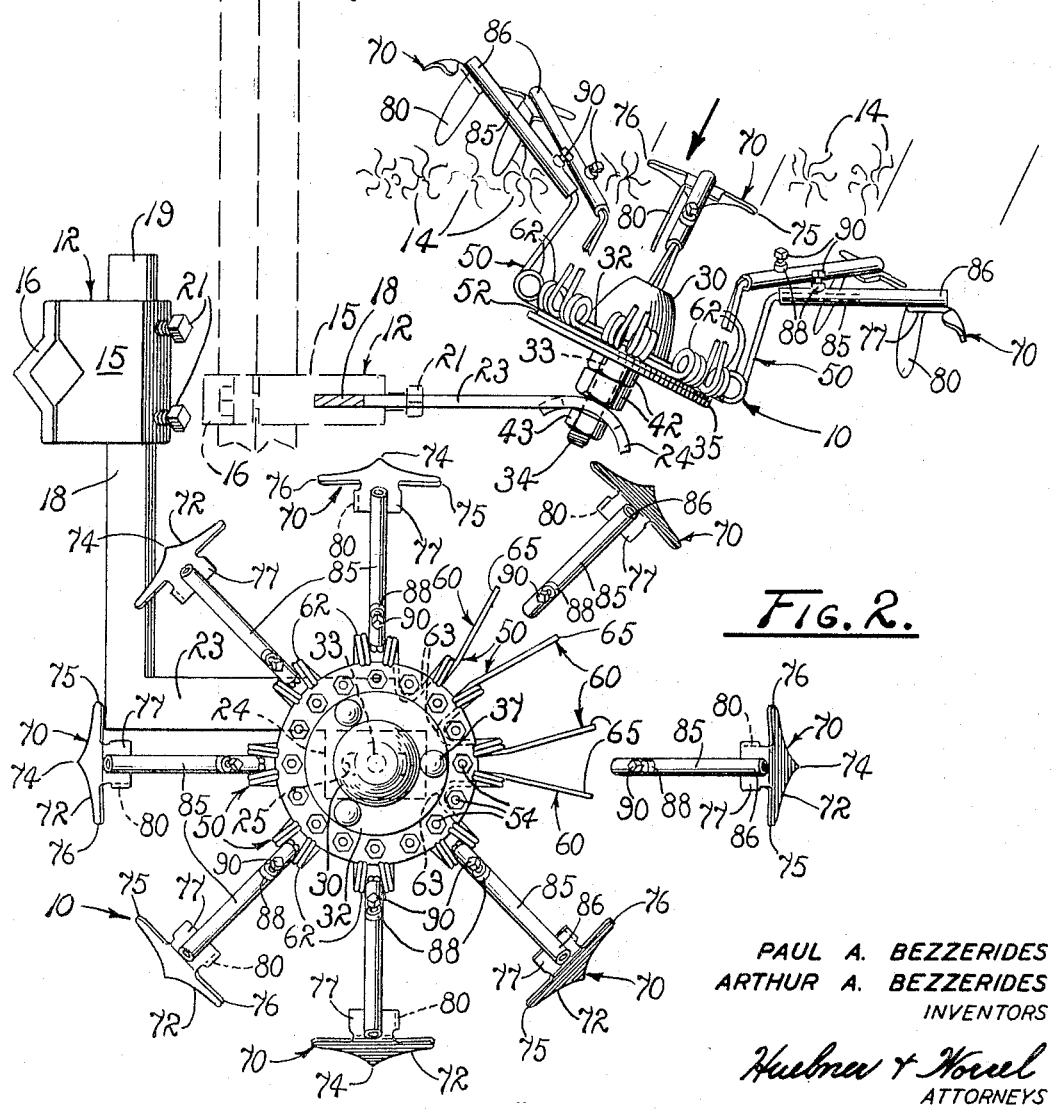
PAUL A. BEZZERIDES
ARTHUR A. BEZZERIDES
INVENTORS
Huebner & Worrel
ATTORNEYS

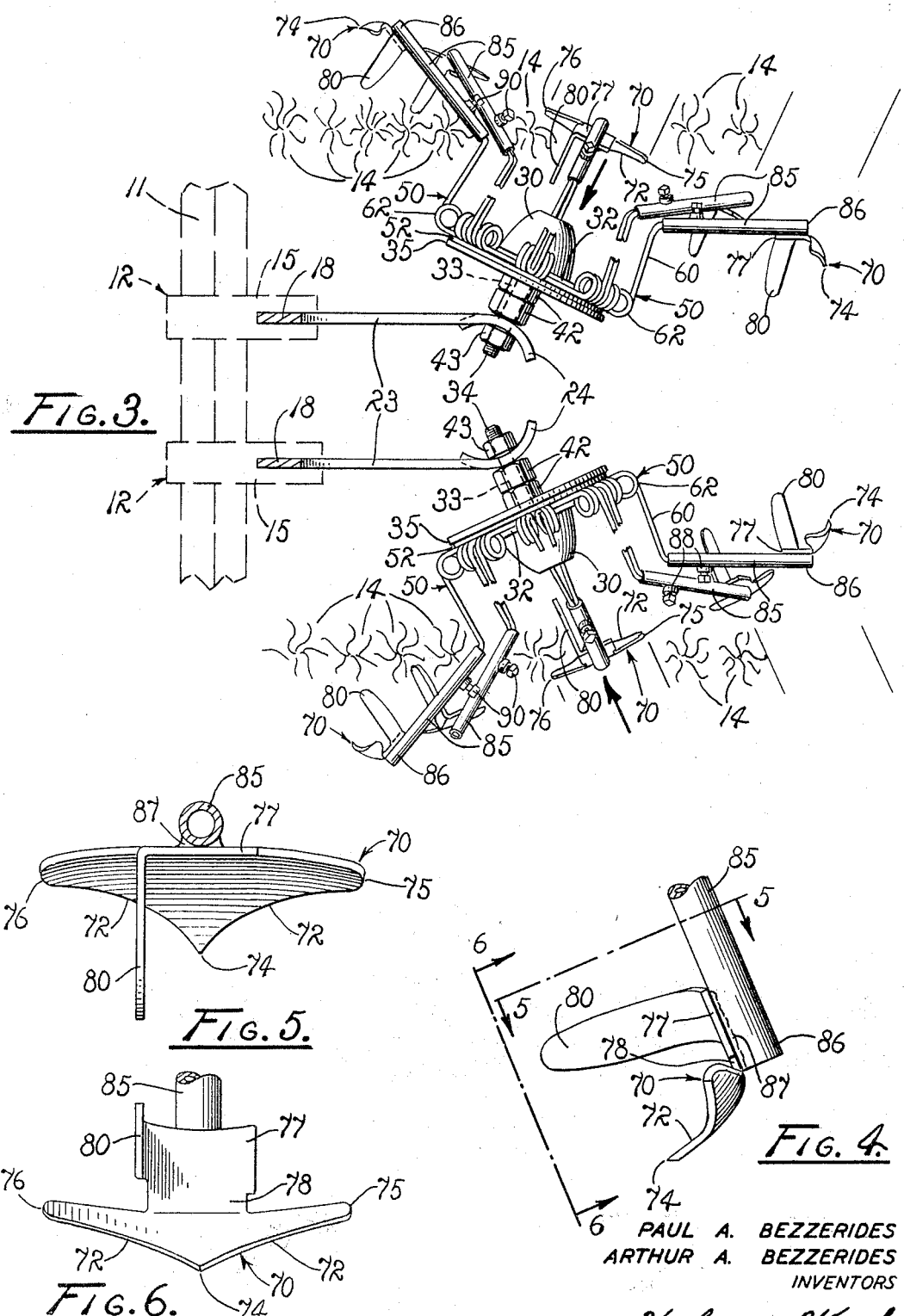

United States Patent Office 3,322,204
Patented May 30, 1967

3,322,204
PLANT THINNER
Paul A. Bezzerides, P.O. Box 1303, and Arthur A. Bezzerides, P.O. Box 211, both of Orosi, Calif. 93647
Filed Nov. 9, 1964, Ser. No. 409,720
6 Claims. (Cl. 172—543)

The present invention relates to a plant thinner for periodically removing plants in rows and more particularly to such a plant thinner providing a plurality of individually resiliently mounted blades which are effective precisely to form regularly spaced swaths through such rows with a flexing wiping action for substantially complete removal of severed plant material from the rows with a minimum of disturbance of earth in adjacent remaining plant areas.

In order to insure that the plants of annual row crops, such as cotton, sugar beets, lettuce, broccoli and the like, have sufficient space to grow to full maturity, excess seedlings are removed at regularly spaced intervals. In the past, such thinning operations have most frequently have done by hand, although recently attempts have been made to mechanize such operations. Various rotary chopping blade devices have previously been employed but have not been as fully effective as desired. Many of these devices have provided a slotted rigid disc type blade which presents a plurality of peripherally disposed cutting edges as shown in the Mayberry et al. Patent No. 2,505,-560. The blades are usually rigidly mounted for earth traversing movement at an angle with respect to the rows so as to be rotated during earth traversing movement with the cutting edges forming diagonal swaths across the rows. With such rigid mounting, the blades, upon encountering an obstruction in the row or caked surface soil, are either damaged or the obstruction is uprooted tearing loose large sections of needed plants in the rows. Furthermore, the cutting edges of such rigid blades are only in earth engagement for limited periods during movement through the lower arc of blade rotation. Consequently, when working in relatively wide rows, such conventional blades do not form a swath entirely across the rows. The only solution thus far has been to increase the diameter of the blades to provide a longer period of earth contact for each cutting edge. It is apparent that such solution is unsatisfactory in view of spaced limitations and the further economic and handling problems allied therewith.

Other structures of the prior art, as exemplified by the Twose British Patent No. 788,250 and the Stone Patent No. 2,960,173, mount the blades on large cumbersome floating frames. These structures permit the entire blade to ride over obstructions such as rocks and other debris, and to conform to depressions and elevations in the terrain traversed. With such unitary floating movement, a number of the following cutting edges on the blades may be held out of earth engagement during a portion of blade rotation, causing skipping and non-uniform plant thinning. Also the relatively thin blade edges present a minimum of frictional contact with the earth and permit erratic blade rotation. In order to overcome this problem, still other structures of the prior art provide paddle blades right-angularly extended in continuous coplanar relation to the main cutting edges which cooperate to form U-shaped pockets. While increasing blade traction, such blades have only experienced limited success. Even during optimum operation these blades have been found to clog and frequently spill earth and several plant material onto adjacent plant areas thereby stifling plant growth.

Therefore, it is an object of the present invention to provide an improved plant thinner for row crops.

Another object of the present invention is to provide such an improved plant thinner capable of forming precisely regularly spaced swaths through the rows of plants.

Another object of the present invention is to provide such an improved plant thinner which leaves the remaining plant areas in condition for optimum growth potential.

Another object of the present invention is to provide a plant thinner which is capable of substantially completely removal of severed plant material from the row with a minimum of disturbance of earth in adjacent plant areas.

Another object of the present invention is to provide a plant thinner which has improved frictional contact with the earth traversed for more positive rotation and uniform plant thinning.

Another object is to provide a plant thinner which is capable of conforming to elevations and depressions in the earth traversed.

Another object is to provide a plant thinner having a plurality of resiliently mounted blades disposed in oblique angular relation to the rows for rotation of the blades during earth traversing movement.

Another object of the present invention is to provide such a plant thinner wherein the blades include right-angularly extended wing portions aligned with the direction of blade movement through the rows to provide increased traction without clogging.

Other objects and advantages of the present invention will be more fully apparent upon reference to the following description in the specification.

In the drawings:

FIG. 1 is a top plan view of a pair of plant thinners embodying the principles of the present invention with portions broken away for illustrative convenience and shown mounted for earth traversing movement in position to move severed plant material laterally outwardly from respective rows of plants which are schematically represented.

FIG. 2 is a side elevation of one of the plant thinners of FIG. 1 with a pair of blades removed and displaced outwardly from their mounting arms to show the arms in relaxed condition.

FIG. 3 is a top plan view of the plant thinners showing alternative thinner positions from that of FIG. 1 which move severed plant material inwardly between adjacent plant rows.

FIG. 4 is a somewhat enlarged side elevation of an individual cutting blade of the plant thinners of the preceeding figures.

FIG. 5 is a top plan view of a plant thinner blade as viewed in the direction of the arrows on line 5—5 of FIG. 4.

FIG. 6 is a front elevation of the blade as viewed from line 6—6 of FIG. 4.

Referring more particularly to the drawings, a plant thinner generally designated by the reference numeral 10 is adapted to be adjustably mounted on an elongated tool bar 11, shown in dashed lines, by a bracket and tool mounting post assembly 12. The tool bar 11 is adapted to be carried in earth traversing movement along a double row of plants 14 on a vehicle such as a tool carrier, tractor, or the like, not shown. The tool mounting assembly 12 includes a bracket 15 which is adapted to be slidably positioned and releasably constrained on the tool bar by a clamp 16. An L-shaped tool post 18 provides an upper end 19 elevationally slideably disposed in the bracket and rigidly secured thereto by a pair of locking bolts 21 screw-threadably mounted in the bracket and tightly wedged against the tool post. The tool post includes a lower end 23 providing an arcuate tool mounting portion 24 thereon which has an elongated slot 25.

As shown in FIGS. 1 and 3, the plant thinners 10 of the present invention are provided in right and left-handed assembly for individual association with each of the rows of plants 14. It is noted that the right and left-hand thinners are interchangeable between their respective positions shown in FIGS. 1 and 3 for reasons hereinafter to be described. As best shown in FIGS. 1 and 2, each of the plant thinners includes a hub 30 having an enlarged radially extended annular flange 32. Each hub is rotatably mounted on an elongated stud 33 having an outer screw-threaded end 34. A backing plate 35 of a larger diameter than the flange of the hub is mounted in circumscribing relation about the stud in facing relation to the flange of the hub. A plurality of mounting bolts 37 are extended through the flange and the backing plate to constrain said members in assembly. A pair of spacer nuts 42 are screw-threadably received upon the outer threaded end 34 of the stud 33 in abutting relation to the mounting portion 24 of the tool post 18. The outer end of the stud is extended through the elongated slot 25 in the mounting portion and is constrained in desired adjusted position by a lock nut 43 screw-threadably disposed on the stud. As shown in FIG. 1, the tool posts are substantially aligned with the direction of movement longitudinally along the rows of plants 14 with the stud 33 of each thinner defining an axis of rotation for its respective hub. Each axis is disposed at a substantially forty-five degree angle to the row of plants.

A resilient arm assembly, generally indicated by the reference numeral 50, is mounted on the hub 18. The arm assembly provides a pair of circular mounting plates 52 disposed about the hub 30 between the flange 32 of the hub and the backing plate 35. The plates 52 are held together by a ring of circumferentially spaced bolts 54 spaced radially inwardly a short distance from the periphery of the plates. A plurality of resiliently flexible arms 60 are supported between the mounting plates 52. Each of the arms is formed from a continuous rod of spring steel material and includes an inner bight portion disposed about a respective one of the bolts 54, spring coil portions 62 radially outwardly disposed from the periphery of the plates, and axially extended intermediate portion 63 having outer outwardly angularly extended ends 65. As best shown in FIG. 2, the outer end of each arm normally extends in spaced substantially parallel relation substantially radially from the plates in a plane axially off-set therefrom. Each of the axially extended intermediate portions 63 of the arms is disposed in spaced substantially parallel relation to its corresponding portion of its respective arm and is disposed closely adjacent to the intermediate arm portion of its adjacent arm. In such position the adjacent outer end portion 65 of adjacent arms 60 are disposed in outwardly diverging relation.

A plurality of earth engaging blades, generally indicated by the reference numeral 70, are individually mounted on each pair of adjacent outer ends 65 of adjacent arms 60 in substantially aligned relation to the direction of thinner rotation. As best shown in FIGS. 4, 5 and 6, each of the blades provides an elongated lower cutting edge 72 providing a centrally disposed triangular shaped point portion 74. The blade includes opposite leading and trailing ends 75 and 76, respectively, which are arcuately curved to enhance rolling of the thinner. An integral upper mounting portion 77 is extended from the blade in a direction opposite from the cutting edge by a neck 78. As best shown in FIG. 4, the mounting portion is obtusely angularly related to the cutting blade so as to form therebetween an included angle of approximately 110°. The blade also includes an integral single wing or paddle 80 substantially right-angularly outwardly extended from the mounting portion of the blade in spaced relation above the cutting edge 72.

An elongated mounting tube 85 having a lower end 86 is individually rigidly secured to the back of the mounting portion 78 of each the blades 70, as by welding in the manner indicated at 87 in FIG. 5. It is apparent that the blade could be alternatively mounted by bolting, if desired. Each tube also includes an opposite extended end 88. A setscrew 90 is screw-threadably received through the wall of each mounting tube adjacent to its extended end. The blades 70 are thereby mounted on the outer ends 65 of the pairs of arms 60 by forcing the adjacent outer ends of adjacent arms together and sliding the mounting tubes thereover until the extended ends 88 of the tubes abut the intermediate portions 63 of the arms. The blades are preferably positioned as shown in FIGS. 1, 2, and 3 and secured to their respective arms by tightening the setscrews 90. In such positions, the cutting edges 72 of the blades are substantially aligned with the direction of thinner rotation and in facing relation to the hub 30. The paddles 80 of the blades are thereby extended in substantial alignment with the axis of rotation of the hub. While such position of the blades is preferred for most operations, it may be desirable under other conditions to provide a different blade setting. This is easily accomplished with the mounting tubes 85 which may be rotated before locking to adjust the blades to any desired angle with respect to the hub.

OPERATION

The operation of the described embodiment of the subject invention is believed to be clearly apparent and is briefly summarized at this point. In all figures of the drawings, the tool bar 11 is adapted to be moved in a forward direction from right to left by the prime mover, not shown. In FIG. 1, the right and left-handed plant thinners 10, as viewed toward the forward direction of movement, are arranged with their forward peripheries disposed adjacent to each other and their rearward peripheries disposed in in diverging relation. As previously described, the hubs 30 are individually secured to their respective tool posts 18 at a substantially forty-five degree angle and at the same angle to their respective rows of plants 14.

During forward movement of the plant thinners, the blades 70 are revolved about the axes of their respective hubs 30 in a counter-clockwise direction as viewed in FIG. 2. With the blades in earth engagement, such forward movement and rotation of the blades causes the cutting edges 72 to move substantially transversely through the rows to cut a swath in substantial parallelism with the axis of the hub and in the direction of the arrows shown in FIG. 1. Also, the loosened earth is permitted to boil rearwardly over the top edges of the blades around the necks 78 of the mounting portions 77. Furthermore, during earth engagement of each blade 70, its respective arm 60 is flexed to position the blade farther axially outwardly from the hub 18 so as to maintain the blades in earth contact for a longer period of time as compared to thinners having rigid blades. As a result, the flexing arms permit the blades to move through the rows in lagging relation to the hub so as to have a flicking or wiping action on the plants. It is estimated that in order for a thinner having rigid blades to cut the same length swath as that obtained with the thinner of the present invention it would have a diameter approximately twice that of the thinner 10.

As the blade 70 reaches the end of its swatch and is lifted from earth engagement its arm 60 return flexes toward the hub so that the blade has an additional propelling force on severed plant material positively to eject it outwardly from the row. Such flexing of the arm also permits the blade easily to ride over any obstructions such as rocks or the like encountered in the row which further precludes tearing loose large clods from the row and plants in adjacent plant areas.

The paddles 80 of the blades 70 move in aligned relation to the direction of movement of the cutting edge 72 in shallow earth penetration. With the paddles disposed above their respective cutting edges they only deeply engage the earth near the end of their swaths to provide tional tractive boost to the thinner. The paddles form a smooth transition between earth engagement of successive blades for more positive rotation and uniform plant thinning.

While the embodiment of the plant thinner 10 is shown in the drawings as having eight blades, it is significant that the thinner may be provided with a greater or lesser number of blades and arm assemblies. For example, if the thinner were provided with twelve blades of the same size as the present embodiment the opposite leading and trailing ends 75 and 76, respectively, of adjacent blades would be disposed closer together. During operation, this would reduce the width of the plant area remaining between the swaths formed by the blades. As previously described, the angularity of the blades may be readily adjusted from their preferred facing positions relative to the hub 30. It is apparent that the width of the swaths formed by the blades will be reduced in corresponding relation to the amount of such angularity. In actual practice, it has been found that any such increase in blade angularity causes additional drag to be imposed against the thinner which tends to inhibit rotation and produces longer swaths more in alignment with the rows. It has also been found that the blades may be completely reversed or turned 180° from the position shown in the drawings. In operation, such blade positioning is best suited for working in muddy soil in which position the back of the blades pushes soil and plant material from the rows with less tendency to clog. It is also significant that larger blades may be utilized or a sufficient number of blades employed so that the ends of adjacent blades touch with successive pairs of blades angled to provide an opening therebetween. Also, the blades may be adjusted radially outwardly from the hub by sliding their respective mounting tubes 85 axially upon their arms 60. This would increase the effective diameter of the thinner and vary the circumferential spacing of the blades. Accordingly, virtually any size or spacing of plant area is obtainable with the nearly limitless adjustable positions of the structure of the present invention.

As best shown in FIG. 3 of the drawings, the right and and left-hand plant thinners 10 are interchangeable from their respective positions of FIG. 1 so that the trailing peripheries thereof are disposed closely adjacent to one another and the forward peripheral portions are forwardly divergently extended therefrom. Such installation merely requires removal of the clamps 16 from the brackets 15 to move the entire plant thinner and mounting assemblies to their reversed positions of FIG. 3. Accordingly, with such installation during forward movement of the tool bar and rotation of the blades 70 as before, the severed plant material is moved inwardly in the direction of the arrows in FIG. 3 for deposit between the rows.

In view of the foregoing it is readily apparent that the structure of the present invention has provided an improved plant thinner which is effective precisely to form regularly spaced swaths through a row of plants which leaves spaced plant areas between the swaths permitting optimum plant growth potential. The flexible blade mounting arms permit the blades to be off-set from the hub so as to be flexed during earth engagement to have a wiping effect as the blades move substantially transversely across substantially the full width of the rows for effective removal of the severed plant material. Furthermore the paddles of the blades provide more positive traction and blade rotation for more uniform spacing of the swaths along the rows.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described our invention, what we claim as new and desire to secure by Letters Patent is:

1. A plant thinner adapted for earth traversing movement in a predetermined forward direction of travel longitudinally along rows of plants comprising a hub mounted for rotation about an axis disposed in oblique relation to said forward direction of travel, a plurality of circumferentially spaced resiliently flexible arms mounted on the hub providing outer ends radially extended and axially offset from the hub, and a plurality of elongated earth engaging blades individually rotatably and axially adjustably mounted on said outer ends of the arms having cutting edges disposed in substantially facing relation to the hub in axially and radially spaced relation thereto for successive movement through the rows in directions substantially parallel to said axis and flexing during said movement in lagging relation to the hub to form spaced swaths through the rows.

2. A plant thinner adapted for earth traversing movement in a predetermined forward direction of travel longitudinally along rows of plants comprising a hub mounted for rotation about an axis disposed in oblique relation to said forward direction of travel, a plurality of circumferentially spaced resiliently flexible arms having inner ends mounted on the hub in axially extended concentric relation about said axis of the hub and individual integral outer ends substantially radially angularly outwardly extended in axial spaced relation to the hub, a plurality of earth engaging blades individually mounted on said outer ends of the arms providing elongated cutting edges disposed in substantially facing relation to the hub for successive movement through the rows in a direction aligned with said axis and flexing during said movement in lagging relation to the hub to form spaced swaths through the rows, and means releasably mounting said blades on the arms for rotational and axial adjustment to positions angularly disposed from said positions facing the hub to vary the width and spacing of the swaths through the rows.

3. A plant thinner adapted for earth traversing movement in a predetermined forward direction of travel longitudinally along rows of plants comprising a hub mounted for rotation about an axis disposed in oblique relation to said forward direction of travel; a plurality of circumferentially spaced resiliently flexible arms having inner ends mounted on the hub in axially extended concentric relation about said axis of the hub and integral outer ends substantially radially angularly outwardly extended in axial spaced relation to the hub; and a plurality of earth engaging blades individually mounted on said outer ends of the arms providing elongated cutting edges disposed in substantially facing relation to the hub with the blades including elongated integral traction members right-angularly extended from the blades toward the hub in substantially parallel relation to said axis and direction of movement of the blades whereby the blades are rotated for successive movement through the rows in a direction parallel to said axis and flexing during said movement in lagging relation to the hub to form spaced swaths through the rows.

4. A plant thinner adapted for earth traversing movement in a predetermined forward direction of travel longitudinally along rows of plants comprising a hub mounted for rotation about an axis disposed in oblique relation to said forward direction of travel; a plurality of circumferentially spaced resiliently flexible arms having inner ends mounted on the hub in axially extended concentric relation about said axis of the hub and integral outer ends substantially radially angularly outwardly extended in axially spaced relation to the hub; and a plurality of blades individually mounted on said outer ends of the arms substantially aligned with the direction of rotation of the arms to provide opposite leading and trailing ends, said blades having elongated cutting edges extended between said ends of the blades in substantially facing relation to the hub with the blades including elongated traction members right-angularly extended from the blades above their respective cutting edges toward the hub in substantially parallel relation to said axis whereby the blades are rotated for successive movement through the rows in a direction aligned with said axis and flex during said movement in lagging relation to the hub to form spaced swaths through the rows.

5. An earth working tool for thinning plants and the like comprising
A. a hub having
  (1) a predetermined axis of rotation;
B. a plurality of mounting arm assemblies mounted on the hub and each providing
  (1) a pair of substantially straight resiliently flexible arms extended outwardly of said axis in substantially equally spaced relation to the hub,
  (2) the arm assemblies being substantially equally spaced about the hub and adjacent arm assemblies providing adjacent arms;
C. tubular members individual to the pairs of adjacent arms rotatably telescopically received over their respective pairs of arms and thus interconnecting the assemblies in circumscribing relation about the axis;
D. a blade mounted on each tubular member for earth engagement;
E. and lock means borne by the tubular members releasably to hold the tubular members on their respective arms and being releasable for rotational and axial adjustment of the tubular members relative to the arms.

6. An earthworking tool for thinning plants and the like comprising
A. a hub having
  (1) a predetermined axis of rotation and
  (2) a substantially flat face disposed in substantially normal relation to the axis;
B. a plurality of mounting arm assemblies each of a continuous length of spring rod material and having
  (1) an intermediate substantially U-shaped portion mounted flatly against the face of the hub and having opposite ends,
  (2) a coil spring continuous with each end of said intermediate portion having an axis disposed substantially tangential to a circle concentric to the hub,
  (3) an extension continuous with each spring extended axially of the hub,
    (a) the extensions of the plurality of arm assemblies being substantially equally spaced from the axis of the hub,
  (4) an outer end continuous with each extension extended substantially radially of the hub,
    (a) the outer ends of the arm assemblies being disposed in a common plane substantially parallel to the face,
    (b) the arm assemblies being substantially equally spaced about the hub and adjacent arm assemblies having adjacent outer ends;
C. a tubular member telescopically received over each pair of adjacent outer ends of the arm assemblies and having an outwardly extended end; and
D. a blade mounted on the outer end of each tubular member for earth engagement.

References Cited

UNITED STATES PATENTS

| | | | |
|---|---|---|---|
| 694,055 | 2/1902 | Elsey | 172—96 |
| 2,308,575 | 1/1943 | Vickery | 172—527 |
| 2,673,503 | 3/1954 | Stallcup | 172—124 X |
| 2,912,055 | 11/1959 | Buddingh et al. | 172—526 |
| 3,150,721 | 9/1964 | Van Der Lely | 172—96 X |

ABRAHAM G. STONE, *Primary Examiner.*

WILLIAM A. SMITH III, *Examiner.*

A. E. KOPECKI, *Assistant Examiner.*